(12) United States Patent
Ichikawa et al.

(10) Patent No.: US 6,965,725 B1
(45) Date of Patent: Nov. 15, 2005

(54) DATA REPRODUCTION APPARATUS AND METHOD

(75) Inventors: Takahiro Ichikawa, Saitama (JP); Takayuki Ishida, Kanagawa (JP); Yoshinori Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 1000 days.

(21) Appl. No.: 09/712,589

(22) Filed: Nov. 14, 2000

(30) Foreign Application Priority Data

Nov. 16, 1999 (JP) .................................. 11-325934
Aug. 24, 2000 (JP) .............................. 2000-254405

(51) Int. Cl.[7] .............................................. H04N 5/91
(52) U.S. Cl. .......................... 386/68; 386/95; 386/125
(58) Field of Search .............................. 386/21, 33, 68, 386/95, 111–113, 116, 125, 12

(56) References Cited

U.S. PATENT DOCUMENTS

| 5,923,815 | A | 7/1999 | Park | |
| 6,201,927 | B1 * | 3/2001 | Comer | 386/68 |
| 6,308,004 | B2 * | 10/2001 | Kawamura et al. | 386/95 |
| 6,553,180 | B1 * | 4/2003 | Kikuchi et al. | 386/95 |

FOREIGN PATENT DOCUMENTS

EP          0 700 221          3/1996

* cited by examiner

Primary Examiner—James J. Groody
Assistant Examiner—Christopher Onuaku
(74) Attorney, Agent, or Firm—Frommer Lawrence & Haug LLP; William S. Frommer; Samuel S. Lee

(57) ABSTRACT

The objectives of the present invention are to reduce the throughput required for a rapid reproduction or other special types of reproduction and to improve also the data access speed at the time of a rapid reproduction. In order to achieve these objectives, the system controller 19 controls so that the address information of the MPEG data reproduced by a pickup 2 may be used to create the first reproduction control information at a sector detection circuit 4, that the second reproduction control information corresponding to the starting point of pictures contained in the MPEG data destined to be reproduction signals by the first reproduction control signal and subjected to an error correction in an error correction circuit 7 may be created in a stream detection circuit 9, and that some MPEG data out of the entire MPEG data may be outputted for a rapid reproduction by referring to the second reproduction control information, and through these steps, the interval of reproducing I pictures in a rapid reproduction by using for example only I pictures is reduced and a smooth reproduction is achieved.

16 Claims, 13 Drawing Sheets

| 32BITS | 1456BITS | 32BITS | 1458BITS |
|---|---|---|---|
| SY0 | ID IED | SY5 | P1 |
| SY1 | | SY5 | P1 |
| SY2 | | SY5 | P1 |
| SY3 | | SY5 | P1 |
| SY4 | | SY5 | P1 |
| SY1 | | SY6 | P1 |
| SY2 | | SY6 | P1 |
| SY3 | | SY6 | P1 |
| SY4 | | SY6 | P1 |
| SY1 | | SY7 | P1 |
| SY2 | | SY7 | P1 |
| SY3 | | SY7 | EDC P1 |
| SY4 | P0 | SY7 | P0  P1 |

FIG.9

| | 0 1 2 3 4 5 6 7 8 9 A B C D E F |
|---|---|
| BUFF_WR | ■ ■ ■ ■ ■ ■ ■ ■ ■ ■ ■ ■ ■ ■ ■ ■ |
| START SECTOR | 1 0 0 0 0 0 0 0 0 0 0 0 0 0 0 0 |
| END SECTOR | 0 0 0 0 0 0 0 0 0 0 0 0 0 0 0 0 |
| OUTPUT ASSIGNING SECTOR | 1 1 1 1 1 1 1 1 1 1 1 1 1 1 1 1 |
| GopHdr DETECTION | 0 0 0 0 0 1 0 0 0 0 0 0 0 0 0 0 |
| I-PicHdr DETECTION | 0 0 0 0 0 1 0 0 0 0 0 0 0 0 0 0 |
| P-PicHdr DETECTION | 0 0 0 0 0 0 0 0 0 1 0 0 0 1 0 0 |
| B-PicHdr DETECTION | 0 0 0 0 0 0 0 1 1 0 0 1 1 0 0 0 |
| SecEnd DETECTION | 0 0 0 0 0 0 0 0 0 0 0 0 0 0 0 0 |
| CORRECTION RESULT FLAG | 0 0 0 0 0 0 0 0 0 0 0 0 0 0 0 0 |
| IP OUTPUT SECTOR | 0 0 0 0 0 1 1 1 1 0 0 0 0 0 0 0 |
| BUFF_RD | ☐ ☐ ☐ ☐ ☐ ■ ■ ■ ■ ☐ ☐ ☐ ☐ ☐ ☐ ☐ |

FIG.16

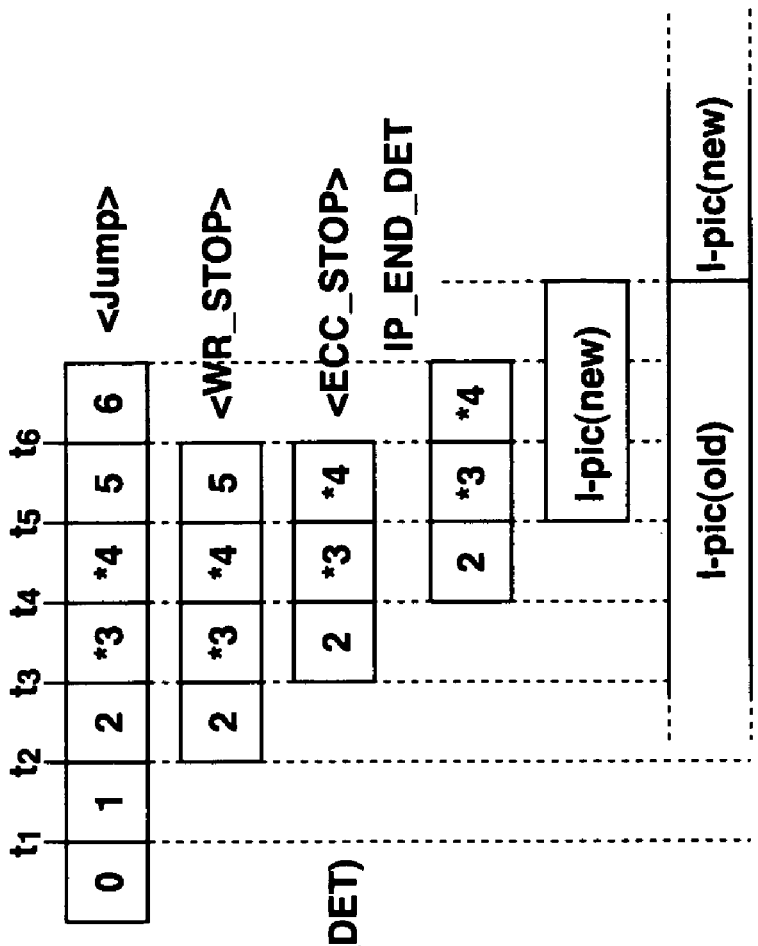

DATA REPRODUCTION APPARATUS AND METHOD

BACKGROUND OF THE INVENTION

1. Field of the Invention

This invention relates to a data reproduction apparatus and method suitable for use in a rapid reproduction in a chronologically forward or backward direction of picture data or voice data stored on disk recording media, such as, for example, an optical disk or a megneto-optical disk.

2. Description of Related Art

One of optical disk apparatus designed to reproduce data (referred hereinafter to as MPEG data) dynamic picture or voice data compressed by a picture compression method according to a certain prescribed standard such as, for example, MPEG (Motion Picture Experts Group) and stored in an optical disk or other recording media was, for example, one shown in FIG. 1.

In this optical disk apparatus 100, MPEG data stored in the optical disk 101 is reproduced by the irradiation of laser beam on the optical disk 101 and by the pickup of the reflected beam with an optical pickup 102. At this time, MPEG data detected by the optical pickup 102 are inputted into a demodulator circuit 103 to be demodulated. The MPEG data demodulated by the demodulator circuit 103 are supplied to a ring buffer memory 106 through a sector detection section 104 and a memory controller 105, and then are corrected and decoded to be outputted.

Here the sector detection circuit 104 detects sector address numbers (addresses allocated to the sectors of the optical disk 101) from MPEG data demodulated in the demodulator circuit 103 and outputs the same to the memory controller 105. Here, if the sector detection circuit is unable to detect sector address numbers or if the sector address numbers that may be detected are not consecutive, the sector detection circuit outputs a sector address number anomaly signal to a track-jump control circuit 107.

An error correction circuit 108 reads the MPEG data supplied by the demodulator circuit 103 through the sector detection circuit 104 and stored in the ring buffer memory 106 to detect errors and uses parity bits added to the MPEG data (parity information) to correct the errors. When this error correction circuit 108 cannot correct the data errors even as a result of corrections made, the same circuit outputs an error occurrence signal to the track-jump control circuit. The corrected MPEG data, after being subjected to the detection of errors at the error detection part 109, are supplied to the ring buffer memory 106 to be stored therein according to the control of the memory controller 105.

The memory controller 105 controls the data destined to be stored in the ring buffer memory 106. The memory controller 105 reads the sector address number for each sector of the optical disk 101 from the output of the sector detection circuit 104 and specifies write addresses (write pointers WP) that cause the data coining from the sector detection circuit 104 to be stored in the ring buffer memory 106 (to be written in the ring buffer memory 106) in response to the sector address numbers. In addition, the memory controller 105 determines whether the volume of data stored in the ring buffer memory 106 proceeding from the sector detection circuit 104 exceeds an ECC (Error Correction Codes) block and specifies the addresses for reading MPEG data from the ring buffer memory 105 and writing the same in the error correction circuit 108 and the addresses for storing the corrected MPEG data in the ring buffer memory 106 (ECC end pointers EP).

And the memory controller 105 specifies the readout addresses (output pointers RP) for reading the MPEG data written in the ring buffer memory 106 based on code request signals proceeding from a video decoder 111 and an audio decoder 112 provided at a later stage. And these request signals cause data to be read from the ring buffer memory 106.

The MPEG data to be reproduced and outputted are supplied to a multiplexer 110 from the ring buffer memory 106. According to information contained in the packet header, the multiplexer 110 separates video data and audio data. The separated video data are supplied to the video decoder 111 through a video buffer 113. The audio data are supplied to the audio decoder 112 through an audio buffer 114. The video decoder 111 decodes according to, for example, the MPEG2 standard. The video data and audio data decoded as are subjected to a D/A conversion process to be outputted through the output terminals 115 and 116.

In the prior optical disk apparatus 100, the MPEG data written in the ring buffer memory 106 are subjected to a correction of errors as and are then supplied to the video buffer 113 in response to a code request signal proceeding from the video decoder 111. Here, when for example simple picture-related data processing continues and the volume of data transfer from the video buffer 113 to the video decoder 111 decreases, the volume of data transfer from the ring buffer memory 106 to the video buffer 113 also decreases. In such a case, the volume of data stored in the ring buffer memory 106 increases and there may be an overflow of data. As a result, the track-jump control circuit 107 calculates (detects) the volume of data currently stored in the ring buffer memory 106 with the help of the write pointers WP and the reproduction pointers RP controlled by the memory controller 105, and when the data volume has exceeded the previously set standard value, the circuit determines that the ring buffer memory 106 may overflow and outputs a track-jump command to a servo circuit 117.

On detecting a sector address number anomaly signal proceeding from the sector detection circuit 104 or an error occurrence signal proceeding from the error correction circuit 108, the track-jump control circuit 107 calculates the volume of data that can be outputted and remaining in the ring buffer memory 106 from the ECC end pointer EP and the output pointer RP controlled by the memory controller 105, and calculates also the volume of data required to assure that the data are read out from the ring buffer memory 106 and written into the video buffer memory while the optical disk 101 makes a round (while the optical disk waits for a round) from the present position. When the volume of residual data in the ring buffer memory 106 is important, even if the MPEG data are read at the maximum transfer rate from the ring buffer memory 106, no underflow occurs in the ring buffer memory 106. Therefore, the track-jump control circuit 107 determines that it is possible to recover from the error by having the data at the error position reproduced again with an optical pickup 102, and outputs a track jump command to the servo circuit 117.

When the track jump control circuit outputs a track jump command, the servo circuit 117 makes the optical pickup jump track at the reproduction position. In other words, when for example the MPEG data are stored from an outer track towards an inner track of the optical disk 101, the servo circuit makes the optical pickup 102 jump from the present position to a adjacent track on the outer side, and during the time while the reproduction position of the optical pickup 12 returns to the former position by making another round, in other words while the sector address number obtained by the sector detection circuit 104 returns to the sector address number of the moment when a track jump occurred, new writing of MPEG data into the ring buffer memory 106 is inhibited, and the MPEG data which have already been stored in the ring buffer memory 106 are transferred as required to the video buffer 113.

If, after a track jump, the sector address number obtained from the sector detection circuit 104 agrees with the sector address number at the moment of the track jump, but still the volume of data stored in the ring buffer memory 105 exceeds the set standard value, in other words when there is a possibility that the ring buffer memory may overflow, the writing of MPEG data into the ring buffer memory 105 is not resumed, and another track jump is tried.

A system controller 118 controls the parts, and specifies in advance the data to be written in the ring buffer memory 106 for reproduction in the sector detection part 104 as sector address numbers. For example, the system controller 118 specifies the write-start-specifying address (SSA) and the write-end address (ESA). And when the MPEG data stored in the optical disk 101 are reproduced, the system controller supplies the track-jump control circuit 107 with a write-start-specifying address (SSA) to output a track-jump command to the servo circuit 107. This serves as an occasion for the servo circuit 117 to drive the optical pickup 102 so that it may jump to a track position according to the write-start-specifying address SSA. The sector detection part 104 detects sector address numbers from the MPEG data demodulated by the demodulator circuit and outputs the same to the memory controller 105. The memory controller 105 reads sector address number for each sector of the optical disk 101 and compares the write-start-specifying address SSA and the write-end address ESA for each sector to determine whether they agree or not.

For example, the optical disk apparatus 100 designed to reproduce MPEG data writes MPEG data in the ring buffer memory 106 by the ECC block. In other words, MPEG data starting with the ECC block containing the MPEG data of a sector where the sector address number agrees with the write-start-specifying address SSA and ending with the ECC block containing the MPEG data of a sector where the sector address number agrees with the write-end address ESA are entered into the ring buffer memory 106.

And the sector detection part 104 creates start-of-sector information, end-of-sector information and output specifying information as the sector information for each sector, and writes the same along with the MPEG data in a specified area of the ring buffer memory 106. The start-of-sector information, end-of-sector information and output specifying information are expressed by 1-bit data. The start-of-sector information is expressed by "1," when the sector address detected by the sector detection part 104 agrees with the write-start-specifying address SSA, and the end-of-sector information is expressed by "1," when the sector address detected by the sector detection part 104 agrees with the write-end address ESA, and the output specifying information is expressed by "1," when the sector address detected by the sector detection part 104 is between the write-start-specifying address SSA and the write-end address ESA.

This sector information is read out from the ring buffer memory 106 to be written into the memory controller 105 before data are read for each sector when data are outputted from the ring buffer memory 106 to the demultiplexer 110 after the error correction and the error detection are completed. Based on bits contained in the output specifying sector information, the system controller 118 is used to judge whether the MPEG data should be outputted from the ring buffer memory 106 to the decoders 111 and 112 at the later stage and to decide whether data strobe signals should be outputted together with the data outputted by the ring buffer memory 106. The data strobe signals are a signal designed to control the operation of the decoders 111 and 112. When they are effective, the decoders 111 and 112 receive the MPEG data from the ring buffer memory 106 and when they are ineffective, the decoders do not receive the same.

For example, when as shown in FIG. 2 the sectors (2)~(D) of the ECC block (N) are specified for output, the sectors (0)~(F) of the ECC block (N) are entered in the ring buffer memory 106 to be followed by the correction of errors. Then, when the sectors (4)~(C) of the ECC block (M) are specified for output, the sectors (0)~(F) of the ECC block (M) are stored in the ring buffer memory 106 to be followed with the correction of errors. After the correction of errors, as shown in FIG. 3, only the MPEG data with output-specified sectors will have effective (1) data strobe signals (STB). For example, the decoders 111 and 112 receive the MPEG data (DATA) when the data strobe signal (STB) is "1" at a time when the clock (CLK) shows "1." Here, the asterisk * shown in FIG. 3 indicates that the data are effective. In this way, in a prior optical disk apparatus 100, sector information is used to control the output of the ring buffer memory 106 and the MPEG data are reproduced without ensuring that the system controller specifies the output for each sector.

When a prior optical disk apparatus 100 is used for rapid reproduction in the forward direction or the backward direction and the video decoder 111 is used to decode only I picture conforming to the MPEG standard for rapid reproduction, the system controller 118 sometimes fails to identify the position where the I picture is arranged from among the MPEG data stored in the optical disk 101. In such a situation, the system controller 118 sets the write-start-specifying address SSA at an appropriate value, and the write-end address ESA at a sufficiently large value in comparison with the set value of the write-start-specifing address SSA. Then, the system controller 118 starts reproducing, outputs the MPEG data having been subjected to the detection of sectors, buffering and the correction of errors to the video decoder 111 and controls the video decoder 111 in such a way that a single I picture would be reproduced thereby. Then, the system controller 118 makes the optical pickup 102 to jump to a position of a track separated by a required number of tracks to reproduce the following I picture for rapid reproduction.

The optical disk apparatus 100 performs, for example, such processing as shown in FIG. 4 when, for example, only the I picture stored over the sectors (3)~(4) of the optical disk 101 are reproduced for rapid reproduction in the forward direction.

In the first place, the system controller 118 of the optical disk apparatus 100 sets the value of the write-start-specifying address SSA at the sector (2) and the value of the write-end address ESA at the sector (99). And the system controller proceeds to reproduce in the forward direction from the sector (0) as shown in FIG. 4A.

Then, upon detecting the sector (2), as shown in FIG. 4B, the sector detection part 104 start writing the MPEG data stored in the sector (2) and thereafter in the ring buffer memory 106 through the memory controller 105.

Then, upon determining that data enough to fill a ECC block have been entered in the ring buffer memory 106, as shown in FIG. 4C, the memory controller 105 outputs the MPEG data stored in the sector (2) and thereafter from the ring buffer memory 106 to the error correction circuit 108 to start the correction of errors.

Then, upon the completion of the processes of error correction and error detection, the memory controller outputs again to the demultiplexer the MPEG data that had been written in the ring buffer memory to have them decoded by the video buffer 113 and the video decoder 111 (FIG. 4D, BUFF_RD). And in response thereto, the video decoder 111 decodes the inputted MPEG data (FIG. 4E, VIDEO_DEC), and outputs the same from the output terminal 115 to display a new I picture (I-pic(new)) on a display apparatus connected externally (FIG. 4F, DISPLAY). And in response to the completion of decoding, the optical pickup is made to jump track (FIG. 4A, jump).

Therefore, when a prior optical disk apparatus 100 proceeds to a rapid reproduction by using only I picture without perceiving the arrangement of I picture, the write-start-specifying address SSA is set at an appropriate value and then the reproduction starts. Thus, even when the I picture is arranged in the sectors (3)~(4), extra sectors (6), (7) and so forth have been reproduced. Therefore, in the prior optical disk apparatus 100, the time spent until the reproduction of the following I picture was longer by the time required to reproduce extra MPEG data. The prior optical disk apparatus 100 contains a problem of a longer time interval for the reproduction of I pictures which in turn inhibits a smooth rapid reproduction.

In contrast thereto, as described in the Japanese Patent Application Laid Open 1996-79687, there is an optical disk apparatus that can detect the position of sectors including the MPEG data at the end of an I picture by analyzing the corrected MPEG data. The optical disk apparatus 100 and the optical disk apparatus described in the Japanese Patent Application Laid Open 1996-79687 are different in that ECC circuits (an error correction circuit 108 and an error detection circuit 109) and a stream detection circuit are connected before the ring buffer memory 106. Incidentally, in the following description, similar parts as the optical disk apparatus 100 are identified by using the same names.

This optical disk apparatus 100, having completed the error correction process on the MPEG data of sectors including the I picture and having stored the same in the ring buffer memory 106, makes the optical pickup 102 jump to a track separated by a specified number of tracks. Therefore, this optical disk apparatus 100 can reduce the time required for storing the MPEG data of the following I picture than the optical disk apparatus 100 by the time lasting from the moment of reading the MPEG data from the ring buffer memory 106 and writing the same into the decoder until the moment of reproducing the I picture on the decoder side.

In this optical disk apparatus 100, in case where for example the MPEG data of the I picture are stored over the sectors (3)~(4) of the optical disk 101, the following steps are taken.

According to this FIG. 5, at first the system controller 118 sets the write-start-specifying address SSA on the sector (2) and the write-end address ESA on the sector (99), and the system controller 118 starts reproducing in the forward direction from the sector (0) (PB_DATA) as shown in FIG. 5A.

Then, the sector detection part 104, on detecting the MPEG data of the sector (2) from the MPEG data reproduced by the optical pickup 102 and inputted through the decoding circuit 103, writes the MPEG data contained in the sector (2) and thereafter at a time $t_2$ and onward in the memory for error correction provided within the error correction circuit 108 (FIG. 5B, ECC_RAM_WR).

Then, upon the determination of the memory controller 105 that MPEG data enough to fill an ECC block have been stored in the memory for error correction, the system controller 118 controls the MPEG data contained in the sector (2) and thereafter and stored in the memory for error correction at the time $t_3$ so that they may be processed for error correction and error detection (FIG. 5C, ECC).

Then, upon completion of the processing of the MPEG data contained in the sector (2) and thereafter for error correction and error detection, the data that have been processed for error correction are stored in the memory for error correction provided in the error correction circuit 108 and the data are outputted from the time $t_4$ onward from the memory for error correction to a stream detection circuit not shown in the drawing (FIG. 5D, ECC_RAM_RD).

Then, the stream detection circuit detects the end of MPEG data of the I picture by referring to information stored in the picture headers added to various pictures (FIG. 5E, STREAM_DET).

Then, based on the information showing the end of the I picture detected by the stream detection circuit, the memory controller 105 writes the sectors (2)~(4) containing the MPEG data from the beginning to the end of the MPEG data of the I picture into the ring buffer memory 106 (FIG. 5F, BUFF_WR).

Then, the memory controller 105 writes the MPEG data contained in the sector (2) and thereafter in the ring buffer memory 106, outputs the MPEG data contained in the sector (2) and thereafter from $t_5$ onward in the demultiplexer 106 (FIG. 5G, BUFF_RD), and the video decoder 111 begins decoding the MPEG data of the I picture from the time $t_6$ onward (FIG. 5H, VIDEO_DEC). And when the video decoder 111 finishes decoding, it outputs on an external display through the output terminal 115 to display the decoded I picture (FIG. 5I, DISPLAY).

In the processing shown in FIG. 5, when the stream detection circuit detects the end of the I picture in the MPEG data that have been processed for error correction and error detection, the system controller 118 makes the optical pickup 102 jump to another track in order to reproduce the following I picture.

Therefore, in a prior optical disk apparatus in which such processing is performed, in comparison with the case where a processing shown in FIG. 4 is performed, the time of starting track-jump is reduced by the time required for the video decoder 111 to decode the MPEG data contained in the I picture.

However, in the optical disk apparatus in which the processing shown in FIG. 5 is performed, the memory for error correction and the ring buffer memory 106 are separate, necessitating a time to transfer the MPEG data from the memory for error correction housed within the error correction circuit 108 to the ring buffer memory 106. In other words, in the optical disk apparatus 100 in which the processing shown in FIG. 5 is performed, it is necessary to detect the end of the I picture by the stream detection circuit after completing the processing for error correction and to store again the MPEG data lasting until the end of the I picture into the ring buffer memory 106 from the stream detection circuit. Therefore, even if the processing shown in FIG. 5 is performed, the time required until the reproduction of the following I picture becomes longer, which means a longer time interval for the reproduction of the I picture and the impossibility of obtaining a smooth rapid reproduction.

Furthermore, in the optical disk apparatus 100 in which the processing shown in FIG. 5 is performed, the ring buffer memory 106 and the memory for error correction are separate and the memory for error correction must be housed within the error correction circuit 108. These requirements resulted in a larger dimension of the whole apparatus.

SUMMARY OF THE INVENTION

It is therefore an object of the present invention to provide a data reproduction apparatus and method that reduces the throughput of rapid reproduction and other special reproduction and that can improve the data access speed at the time of rapid reproduction.

In one respect, the present invention provides a data reproduction apparatus including a reproduction means for reproducing MPEG data according to the MPEG (Moving Picture Experts Group) standard to which address information is added by the sector from a recording medium; the first reproduction control information creating means for creating the first reproduction control information to show whether this is MPEG data which will be regenerative signal by use of the address information added to the MPEG data reproduced by said reproduction means; a storage means for storing MPEG data; an correction means for correcting error of MPEG data designated as MPEG data to be regenerative signal by said first reproduction control information out of MPEG data reproduced by said reproduction means and stored in said storage means, and for storing the corrected MPEG data in said storage means; the second reproduction control information creating means that creates the second reproduction control information designating MPEG data that will be regenerative signal out of the MPEG data corrected by said correction means depending on the starting point of each picture; a decoding means for decoding the MPEG data corrected by said correction means and stored in said storage means, and for outputting the same as regenerative signal; and a control means that outputs a part of MPEG data out of the MPEG data stored in said storing means to said decoding means and thus controls a rapid reproduction by referring to the second reproduction control information produced by said second reproduction control information creating means.

In the data reproduction apparatus according to the present invention, as the control means controls so that the first reproduction control information would be created by the first reproduction control information creating means by using MPEG data before being subjected to an error correction, so that the second reproduction control information would be created by the second reproduction control information creating means by using the MPEG data which would be the reproduction signals specified by the first reproduction control information, and so that the MPEG data which would be the reproduction signals specified by the second reproduction control information would be decoded for reproduction, a lesser volume of data for reproducing the MPEG data that need not to be reproduced according to the first reproduction control information and the second reproduction control information can reduce the throughput required for a rapid reproduction and other special types of reproduction and can also improve the data access speed at the time of a rapid reproduction.

In another respect, the present invention provides a data reproduction method including the steps of reproducing the MPEG data according to the MPEG (Moving Picture Experts Group) standard to which address information is added by the sector from a recording medium; creating the first reproduction control information show whether these are MPEG data which will be regenerative signal by the use of the address information of the reproduced MPEG data; correcting error of the MPEG data designated as the MPEG data to be regenerative signal by the reproduction control information; creating the second reproduction control information designating the MPEG data that will be regenerative signal out of the MPEG data corrected depending on the starting point of each picture; and decoding a part of MPEG data out of the MPEG data corrected by referring to the second reproduction control information for rapid reproduction.

According to the data reproduction method according to the present invention, as MPEG data before being subjected to an error correction are used to create the first reproduction control information, the MPEG data destined to be regenerative signals designated by the first reproduction control information are used to create the second reproduction control information, and the MPEG data destined to be the regenerative signals designated by the second reproduction control information are decoded to be reproduced, a lesser volume of data for reproducing the MPEG data that need not be reproduced by the first reproduction control information and the second reproduction control information can reduce the throughput for a rapid reproduction and other special types of reproduction, and also improve the data access speed at the time of a rapid reproduction.

BRIEF DESCRIPTION OF THE DRAWINGS

FIG. 9 is a drawing showing the format of data stored in the optical disk.

FIG. 16 is a drawing intended to illustrate the creation of the first sector information and the second sector information by a sector detection circuit and a stream detection circuit provided in the optical disk reproduction apparatus according to the present invention.

FIGS. 17A to 17F are drawings intended to illustrate the process of rapid reproduction by the optical disk reproduction apparatus according to the present invention.

DESCRIPTION OF THE PREFERRED EMBODIMENTS

Figure 1:
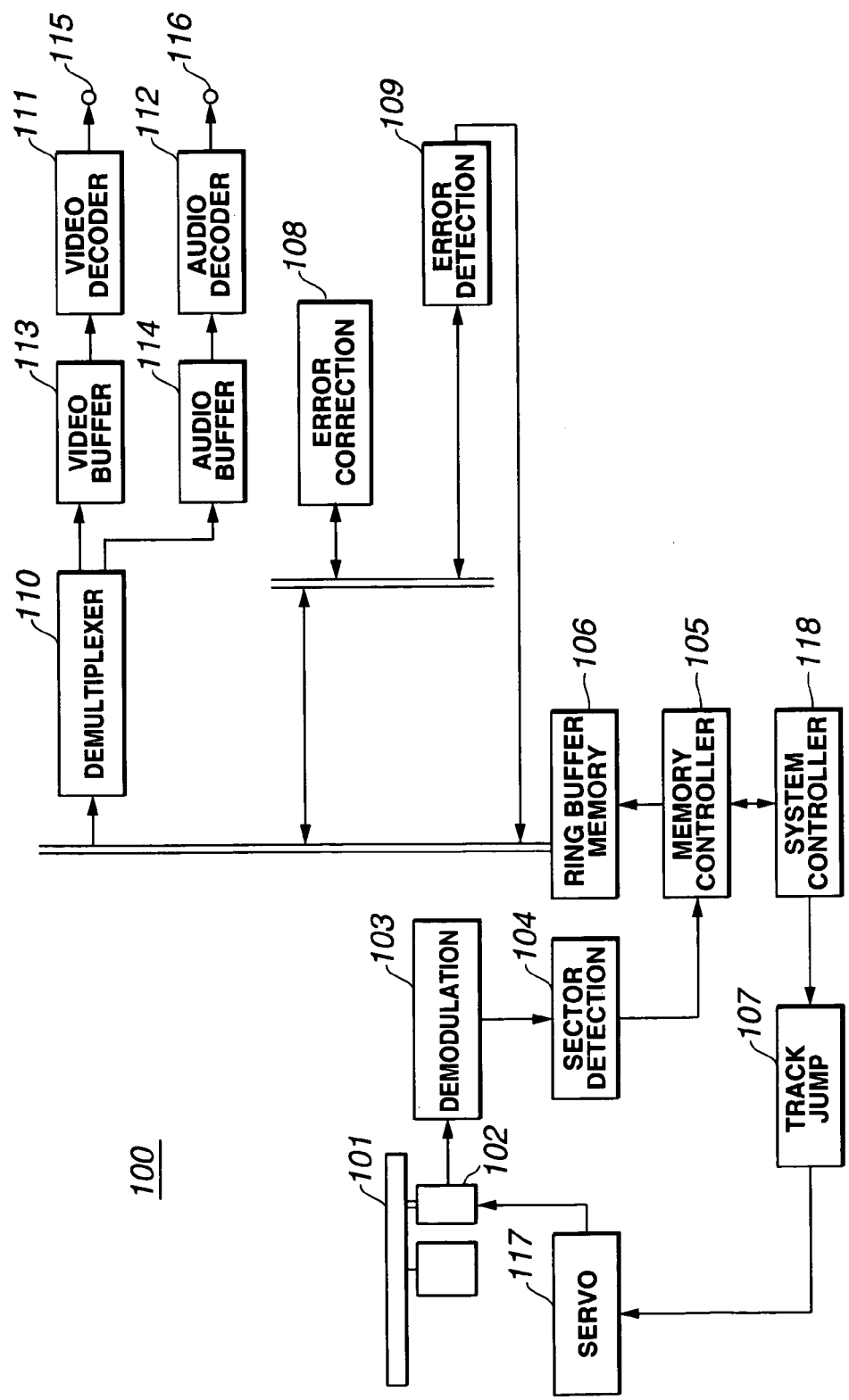
FIG. 1 is a block diagram showing the structure of a prior optical disk apparatus.
Figure 2:
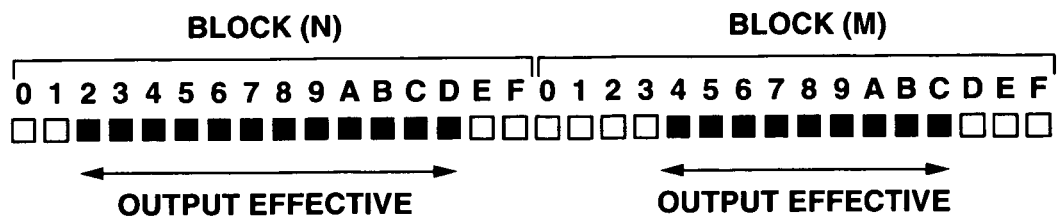
FIG. 2 is a drawing intended to illustrate the process for reproducing data with a prior optical disk apparatus.
Figure 3:
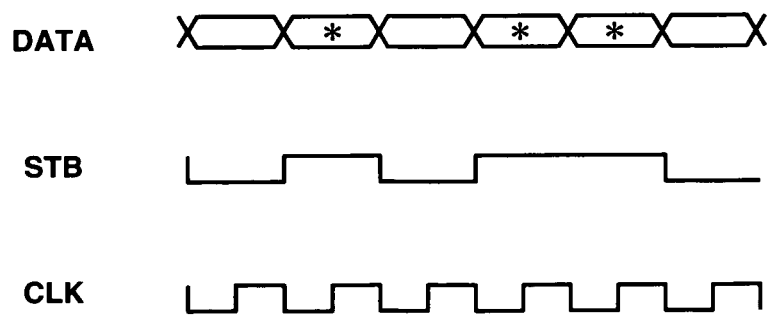
FIG. 3 is a drawing intended to illustrate the processing timing for reproducing data with a prior optical disk apparatus.
Figure 4:
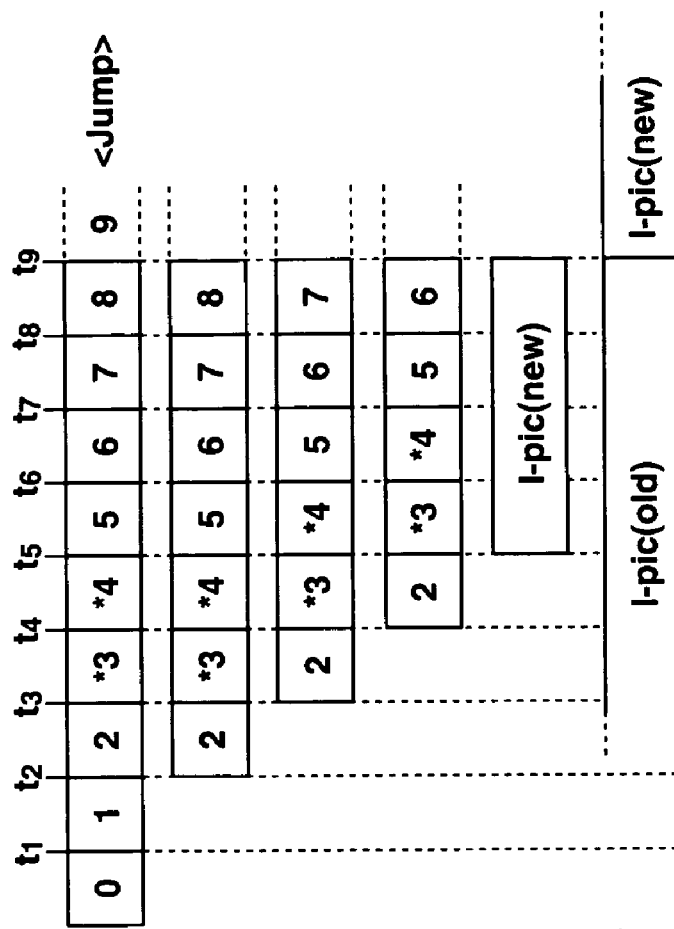
FIGS. 4A to 4F are drawings intended to illustrate a process of rapid reproduction by a prior optical disk apparatus
Figure 5:
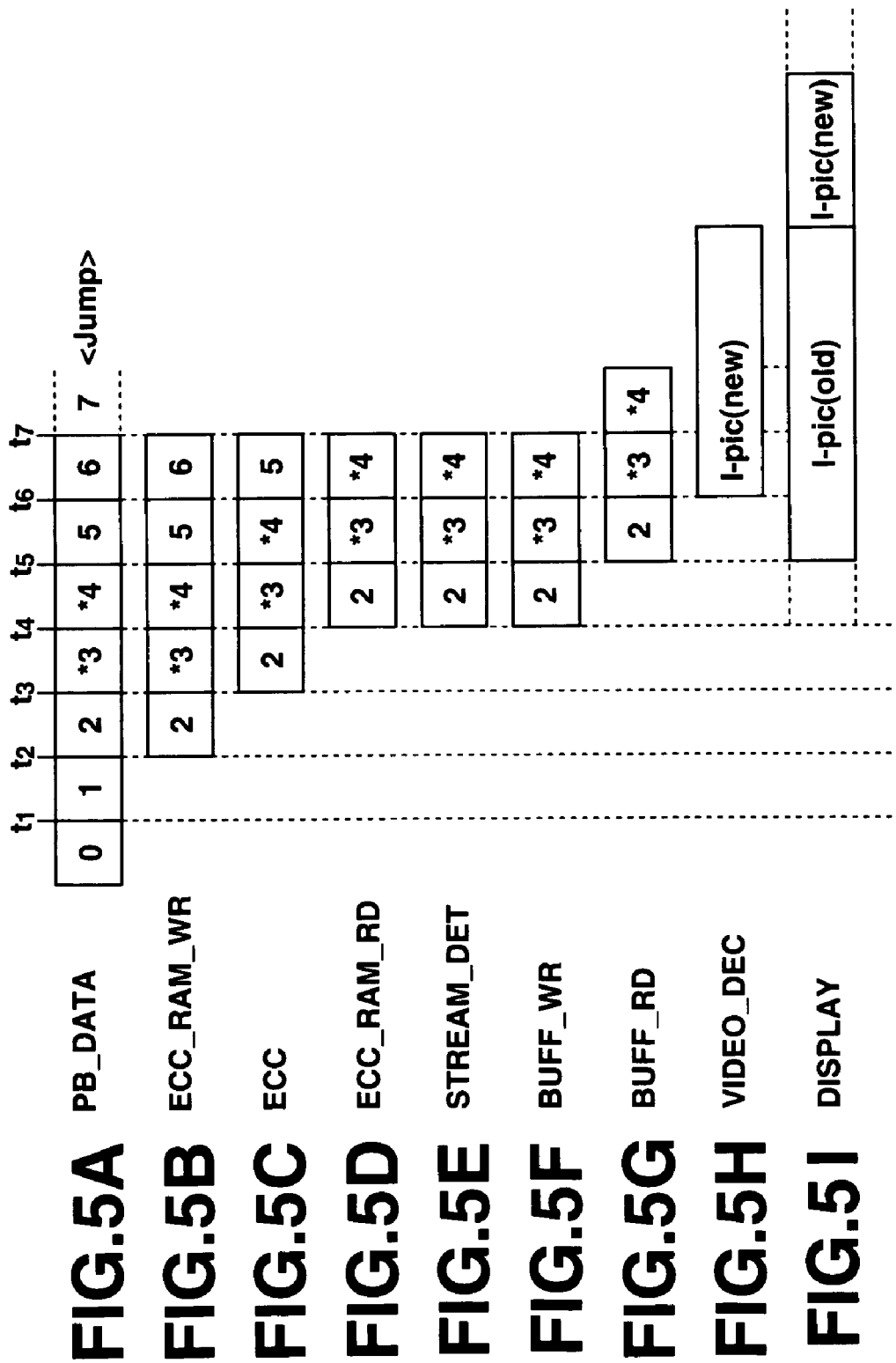
FIGS. 5A to 5I are drawings intended to illustrate another process of rapid reproduction by a prior optical disk apparatus.

Referring to the drawings, preferred embodiments according to the present invention will be explained in detail.

Figure 6:
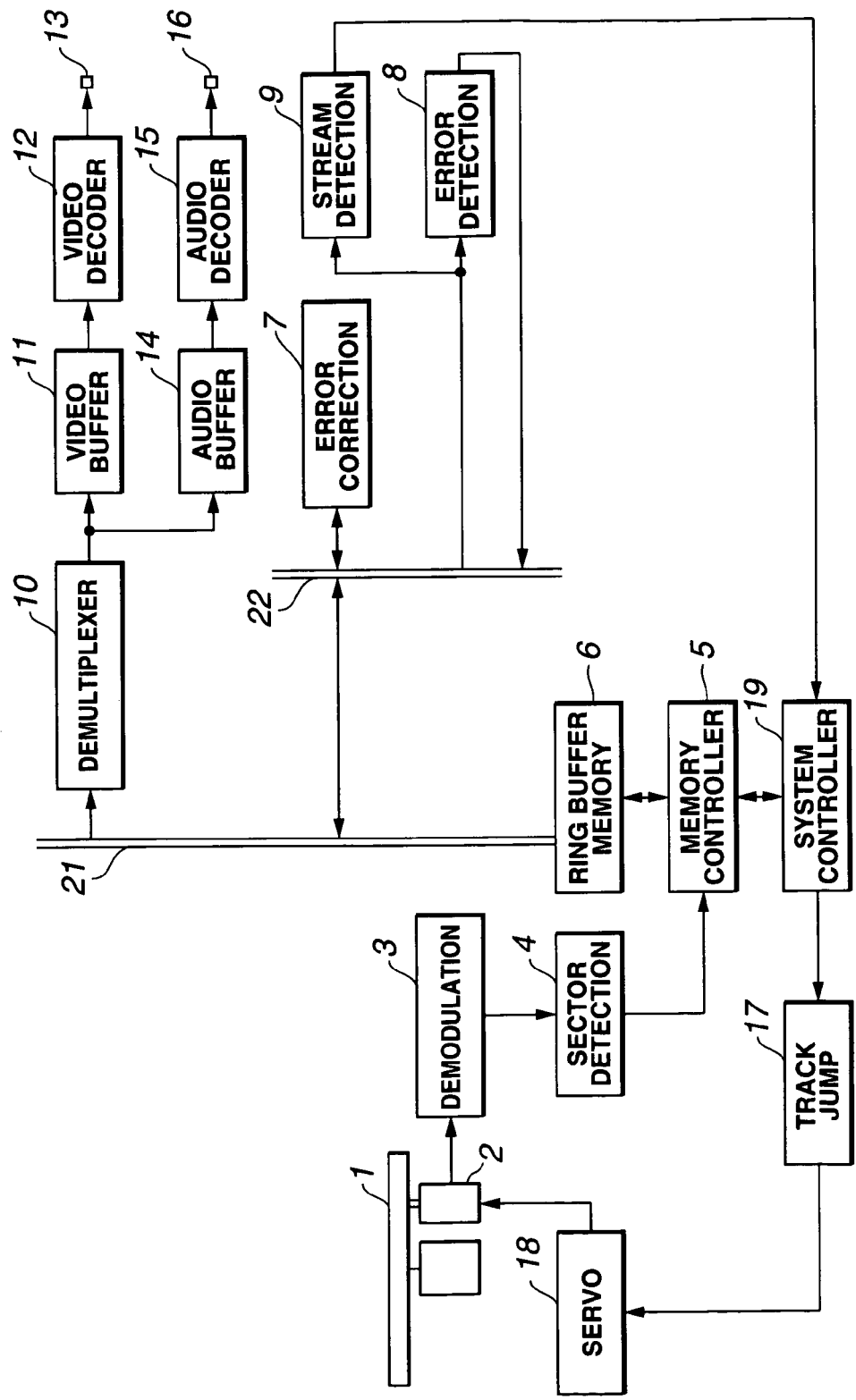
FIG. 6 is a block diagram showing the structure of an optical disk reproduction apparatus according to the present invention.

The present invention relates to an optical disk reproduction apparatus configured as shown in FIG. 6 for example.

The optical disk reproduction apparatus shown in FIG. 6 is provided with an optical disk on which video data and audio data are stored according to the MPEG (Moving Picture Experts Group) standard. The data according to the MPEG method are data representing dynamic image and voice, compressed by a picture compressing method conforming to the MPEG (Moving Picture Experts Group) standard and stored on optical disks or other recording media.

Figure 7:
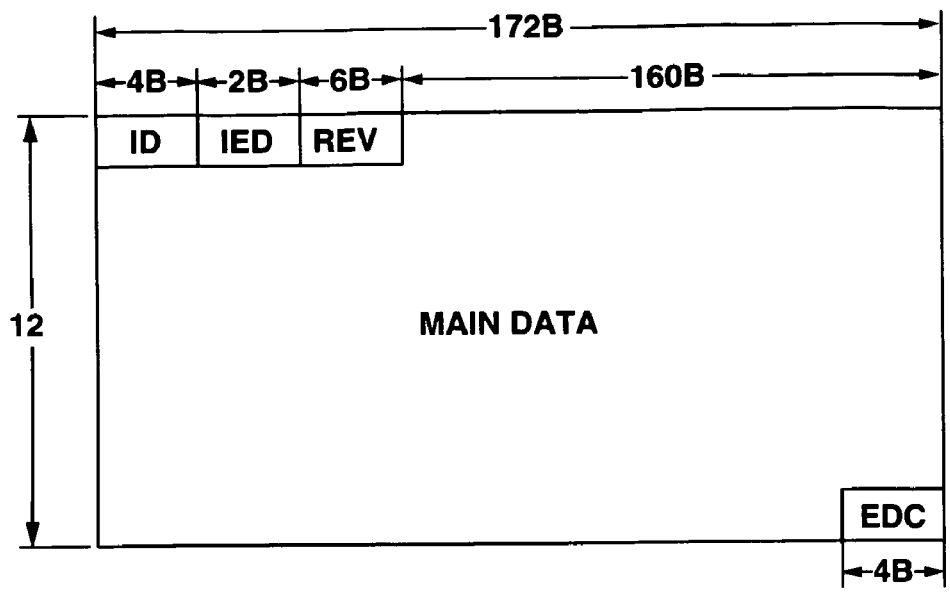
FIG. 7 is a drawing showing the format of data stored in an optical disk.
Figure 8:
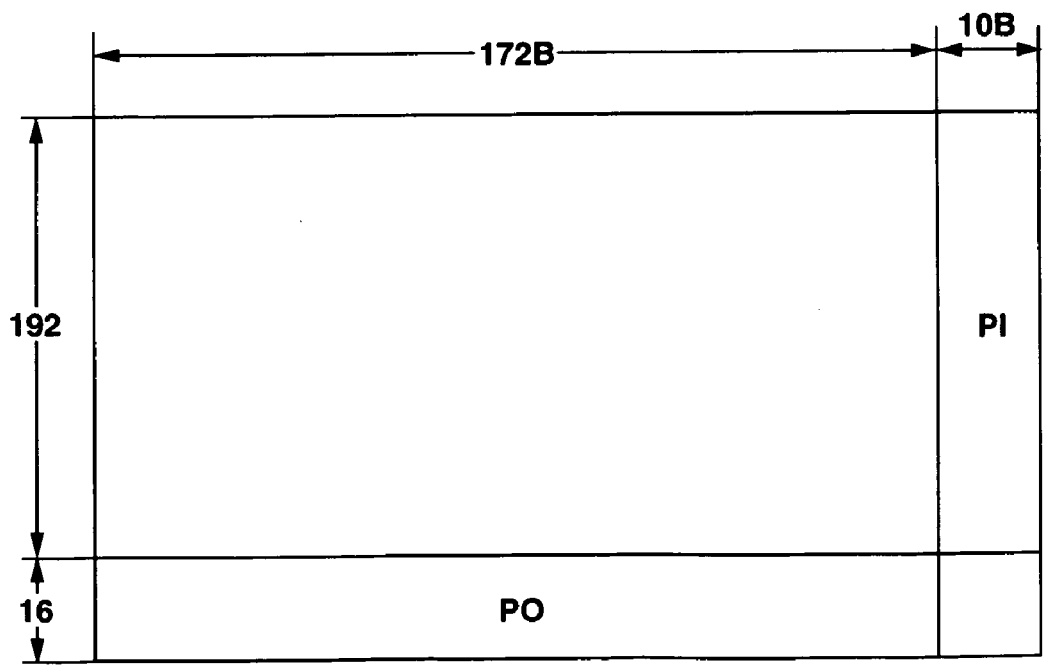
FIG. 8 is a drawing showing the format of data stored in the optical disk.

As shown in FIG. 7, a sector of data stored on an optical disk 1 consists of data consisting of 12 lines×172 bytes. A sector is lead by a 4-byte ID showing its physical address followed by a 2-byte parity for this ID (IED). And 5-byte reserve data (RSV) are followed by the main data of 2,048 bytes. A sector ends with a 4-byte error detection code (EDC). And as shown in FIG. 8, 16 sectors of data each consisting of (12 lines×172 bytes) are grouped together for two-dimensional arrangement of (192 lines×172 bytes) to form an ECC (Error Correction Codes) block. To the (192 lines×172 bytes) data, a 10-byte internal code parity PI ((182, 172, 11) Reed-Solomon code) is added in the line direction, and a 16-column external code parity PO ((208, 192, 17) Reed-Solomon code) is added in the column direction.

The data codified as error correction codes are interleaved in such a way that the 16 lines of parity PO may be disposed one line for each data sector. The interleaved data to which a set pattern sink is added are EFM (eight-fourteen modulation) Plus modulated to be stored on an optical disk 1. Therefore, the physical structure of data stored on an optical disk 1 is as shown in FIG. 9. As the data stored on an optical disk are EFM modulated, 1,456 bits correspond to 91 bytes. In FIG. 9, SY0, SY1, SY2, . . . represent sink patterns.

Now, the MPEG data stored on an optical disk will be explained.

Figure 10:
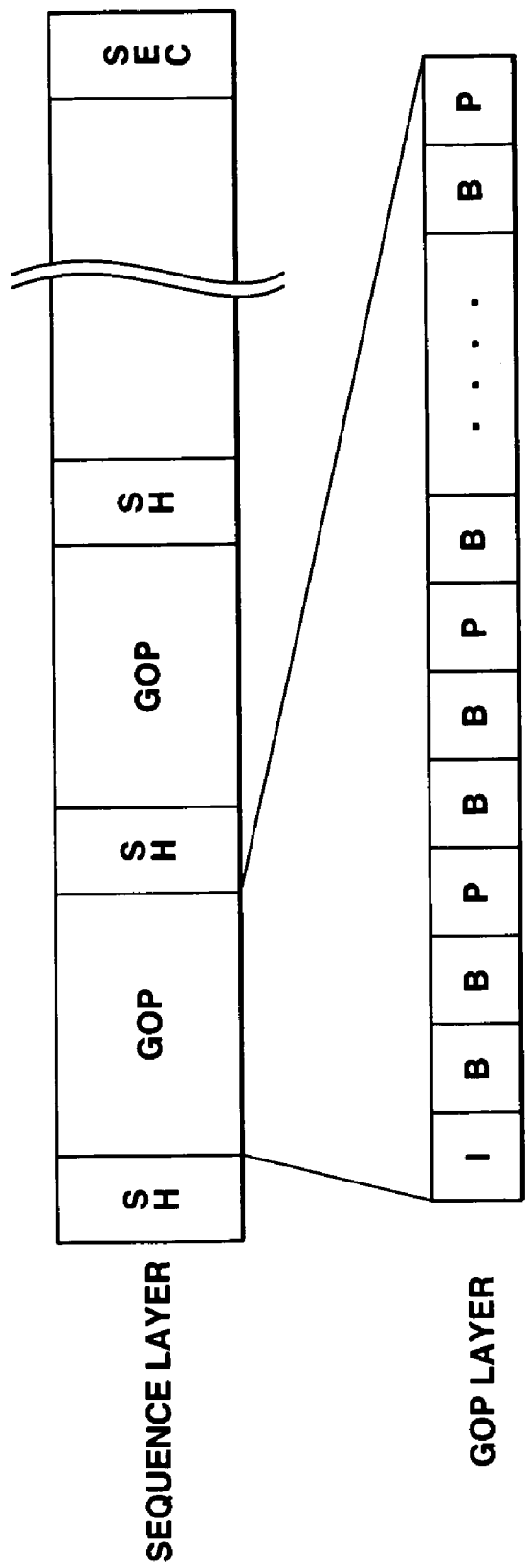
FIG. 10 is a drawing showing the format of data stored in the optical disk.

Each sequence of the data stored on an optical disk according to the MPEG method consist, as shown in FIG. 10, of a sequence header (SH) and GOP (Group of Pictures) data. At the top of the sequence header, a sequence header code is added. And at the end of the sequence, a sequence end code (SEC) (hereinafter referred to as "Sequence End Code (SeqEnd)") is added.

The GOP data include at least a frame internally codified picture or Intra-Picture (hereinafter referred to as "I picture"), an interframe forward direction predictive coding picture or Predictive-Picture (hereinafter referred to as "P picture") and a bidirectionally predictive coding picture or Bidirectionally Predictive Picture (hereinafter referred to as B picture), and 15 pictures are arranged therein. And these GOP data are lead by a Group Start Code (hereinafter referred to as "Group Start Code or GopHdr"). And each picture data are lead by a Picture Start Code and a Picture Coding Type showing the relevant picture type.

The optical disk reproduction apparatus shown in FIG. 6 comprises an optical pickup 2 that reads recorded signals stored in an optical disk 1. This optical pickup 2 has an objective and other items of the optical system and a photodetector, and upon reading recorded signals stored in the optical disk 1 by detecting light varying in response to the recorded signals. This optical pickup 2 outputs the recorded signals that it had read to a demodulation circuit 3.

The demodulation circuit 3 processes the recorded signals proceeding from the optical pickup 2 for demodulation. Specifically, the demodulation circuit 3 converts the recorded signals each structured by 8 bits into a 16-bit data pattern by referring to a specified conversion table to create data. This process is referred to as "EFM (Eight Fourteen Modulation) Plus." Then, the data are outputted to the sector detection circuit 4.

The sector detection circuit 4 creates the first sector information on the data demodulated in the demodulation circuit 3. This sector detection circuit 4 detects sink patterns SY0, SY1, SY2, . . . in the data and detects the sector address numbers corresponding to the addresses allocated to various sectors of the optical disk 1 to create the first sector information. The sector detection circuit 4 creates the start sector information showing the start address of each sector, the end sector information showing the end address of each sector, and the output specifying sector information showing the sector to be reproduced as the first sector information. The sector detection circuit 4 outputs the data proceeding from the demodulator circuit 3 and the first sector information to the memory controller 5. The first sector information is expressed by 1-bit data and is stored in a specified area of the ring buffer memory 6.

And the sector detection circuit 4 outputs a sector address number anomaly signal to the system controller 19 when, for example, it failed to detect sector address numbers and even if it detected the same, if the address numbers are not successive.

As soon as the data proceeding from the sector detection circuit 4 and the first sector information are inputted, the memory controller 5 operates in response to the control signal proceeding from the system controller 19 and manages the data to be inputted into the ring buffer memory 6 at a later stage.

The memory controller 5 reads the addresses of the data inputted, and specifies the write addresses (write pointers WP) that makes the ring buffer memory 6 store the data in response to the addresses read.

And this memory controller determines whether the quantity of data stored in the ring buffer memory 6 exceeds an ECC block or not, and specifies the address for reading data from the ring buffer memory 6 to transfer the same to the error correction circuit 7 and the address for storing the corrected data in the ring buffer memory 6 (ECC end point EP).

And the memory controller 5 specifies the address for reading the data stored in the ring buffer memory 6 (output pointer RP) based on code request signals proceeding from the video decoder 12 and the audio decoder 15 at a later stage. At this moment, the memory controller 5 creates data strobe signals according to the control signals proceeding from the system controller 19 corresponding to the first sector information and the second sector information on each sector that had been created at the sector detection circuit 4 and the stream detection circuit 9 and outputs the data stored in the ring buffer memory 6.

The ring buffer memory has a ring-shaped address structure that enables to return to the start address after advancing to the end address from the start address, and the input-output of data thereto and therefrom is controlled by the memory controller 5. This ring buffer memory stores the data proceeding from the memory controller 5 and the first sector information, the data that had been processed for error correction and detection, and the second sector information described below. This ring buffer memory 6, under the control of the memory controller 5, outputs data to the error correction circuit 7 through a data bus 21, and outputs the data that had been processed for error correction to the demultiplexer 10 through a data bus 21. Further specific structure of this ring buffer memory 6 will be described later on.

The error correction circuit 7 reads data by the ECC block proceeding from the ring buffer memory 6 to detect errors, and uses the parity bit added to the data (parity data) to correct the errors. At this time, the error correction circuit 7 processes the PI series and the PO series for the correction of errors. In case of a failure to correct the errors of data, the error correction circuit 7 outputs an error occurrence signal to the system controller 19 through the ring buffer memory 6 and the memory controller 5. The error correction circuit 7 outputs the corrected data to the ring buffer memory 6 through the data bus 21.

The error detection circuit 8 takes a step of detecting errors by using the data processed for error correction and stored in the ring buffer memory 6 and performing a parity operation of error detection codes (EDC) in order to determine whether errors exist or not. This error detection circuit 8 outputs the result of error detection into the stream detection circuit 9.

The stream detection circuit 9 creates a correction result flag showing whether each sector contains errors or not and an IP (I-Picture) output sector information showing whether I picture data are contained or not as the second sector information.

At the time of creating the IP output sector information, the stream detection circuit 9 takes the steps of detecting the group start codes GopHdr showing the start position of GOP data from the video data, detecting the sequence end SeEnd and detecting the picture start codes PicHdr.

To begin with, the stream detection circuit takes the step of detecting picture start codes PicHdr added to the I pictures. Then, upon detecting picture start codes PicHdr added to the I pictures, P pictures or B pictures, the stream detection circuit 9 determines that an area extending from the sector containing the picture start codes PicHdr added to the I picture to the sector containing the picture start codes PicHdr added to the I picture, P picture or B picture contains the data of the I picture. Then, upon detecting group start codes GopHdr or sequence end SeqEnd, the stream detection circuit 9 determines that an area extending from the sector containing the picture start codes PicHdr added to the I picture to the sector containing the group start codes GopHdr or the sequence end SeqEnd contains the data of the I picture. The stream detection circuit sets the bit for the IP output sector information of the sector determined to contain the data of the I picture at "1," and the bit for the IP output sector information of the sector determined to be ineffective of data of the I picture at "0."

And on determining that the sector where data have been inputted according to the result of error detection from the error detection circuit 8 contains errors, the stream detection circuit 9 sets the bit for the correction result flag at "1," and upon determining that the sector where such input had been made contains no errors, the stream detection circuit 9 sets the bit for the correction result flag at "0."

And this stream detection circuit 9 detects the picture start codes PicHdr added to the I pictures, and creates IP output end detection signals every time when the error detection circuit 8 completes the error detection of the sectors where the picture start codes PicHdr added to the I pictures, P pictures or B pictures have been detected or the sectors where the group start codes GopHdr or the sequence end SeqEnd have been detected.

This stream detection circuit outputs the second sector information consisting of the correction result flag created as described above and the IP output sector information and the IP output end detection signals to the system controller 19. The second sector information is expressed by 1-bit data and is written along with the first sector information in a specified area of the ring buffer memory 6.

The demultiplexer 10 is connected with the data bus 21, and data are inputted therein from the ring buffer memory 6 through the data bus 21. This demultiplexer 10 separates video data and audio data by referring to the information showing whether the relevant data are video data or audio data from among the header information contained in each packed data, outputs the video data to a video buffer 11 and the audio data to an audio buffer 12.

The video buffer 11 stores temporarily the video data supplied by the demultiplexer 10 and outputs the video data at a specified timing to the video decoder 12.

The video decoder 12 accepts the input of video data supplied by the video buffer 11 and decodes for example the data compressed by the method conforming to the MPEG standard. This video decoder 12 consists for example of a reverse VLC (Variable Length Coding) circuit, a reverse DCT (Discrete Cosine Transform) circuit, a reverse quantization circuit, a MC (Motion Compensation) circuit, etc.

The reverse VLC circuit performs a reverse VLC processing of the video data inputted, and upon the completion of the reverse VLC processing of the data inputted, outputs the data to the reverse quantization circuit. At the same time, the reverse VLC circuit outputs a code request signal indicating a command to output video data from the video buffer 11 to the video decoder 12 to the video buffer 11 to obtain new video data. And the reverse VLC circuit outputs a quantization step size or a motion vector to the reverse quantization circuit or the MC circuit.

The reverse quantization circuit processes the video data inputted for reverse quantization according to a quantization step size supplied by the reverse VLC circuit, and outputs the processed data to the reverse DCT circuit. And the reverse DCT circuit processes the data inputted for reverse DCT and output the processed data to an addition circuit. The data supplied from the reverse DCT circuit to the addition circuit, if data for the I pictures, are outputted as they are to the frame memory through the addition circuit to be stored therein.

And in case where the data supplied from the reverse DCT circuit to the addition circuit are P pictures predicted by I pictures, the video decoder 12 reads the data for I picture that had been already decoded from the frame memory, and provides a motion compensation corresponding to a motion vector supplied from the reverse VLC circuit to the data supplied from the frame memory with the help of the motion compensation circuit, adds the data outputted from the reverse DCT circuit and the data subjected to a motion compensation to create data for P pictures and store the same in the frame memory.

In addition, in case where the relevant data are data for B pictures inputted from the reverse DCT circuit, the video decoder 12 reads the data already decoded for I pictures and P pictures, provides a motion compensation to the data with the help of the MC circuit, adds the data supplied by the reverse DCT circuit and the data subjected to a motion compensation to create data for B pictures, and store the data in the frame memory.

Moreover, the video decoder 12 converts the decoded video data from digital data to analogue data with a D/A converter and create a video signal, and outputs the video signal to the outside through an output terminal 13.

The audio buffer 14 stores temporarily the audio data supplied by the demultiplexer 10 and outputs the audio data at a specified timing to the audio decoder.

The audio decoder 15 decodes the audio data codified by a specified codification system, converts the data D/A to create an audio signal, and outputs to the outside the audio signal through an output terminal 16.

The track-jump control circuit 17 creates a track-jump signal for moving the optical pickup 2 onto the track formed on the optical disk 1 according to the control signal supplied by the system controller 19 and outputs the same to the servo circuit 18.

The servo circuit 18 creates a driver signal designed to drive the optical pickup 2 according to the track-jump signal supplied by the track-jump control circuit 17, and supplies the driver signal to a thread motor that drives the optical pickup 2 to make the optical pickup 2 jump to another track.

Now, the operation of the ring buffer memory 6 provided on the optical disk reproduction apparatus will be described.

Figure 11:
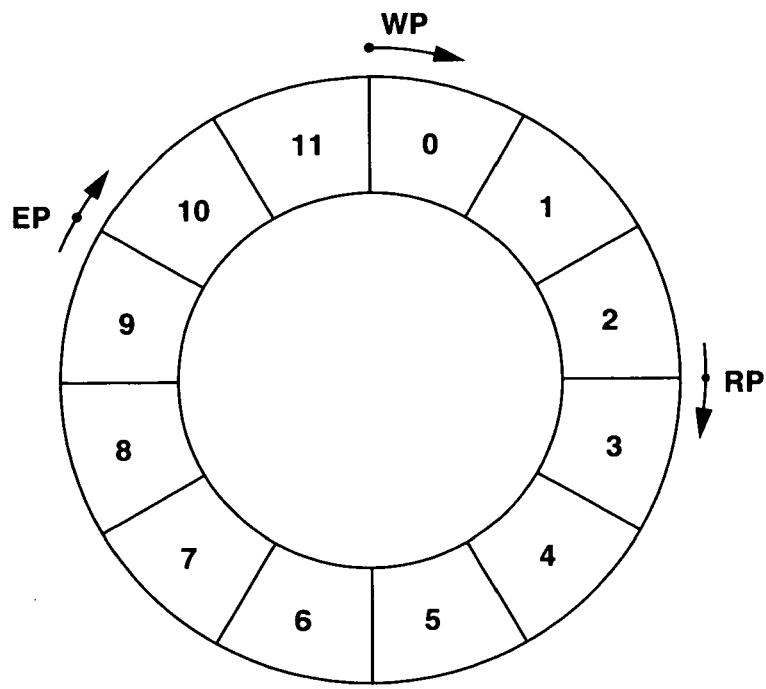
FIG. 11 is a drawing intended to illustrate the structure of a ring buffer memory provided in the optical disk reproduction apparatus according to the present invention.

As shown in FIG. 11, the ring buffer memory 6 has an address structure that automatically produces a return to the top address after reaching the end address. In other words, as shown in FIG. 11, when the address (X) (X is the address number) is set between the address number (0) to the address number (11), the address number starting from the address (0) progresses to the address (1), the address (2), . . . and reaches the address (11). Then, the address number returns to the address (0), and advances again to the address (1), the address (2), . . . . Such ring buffer memory 6 is structured in specific terms on the FIFO principle.

Figure 12:
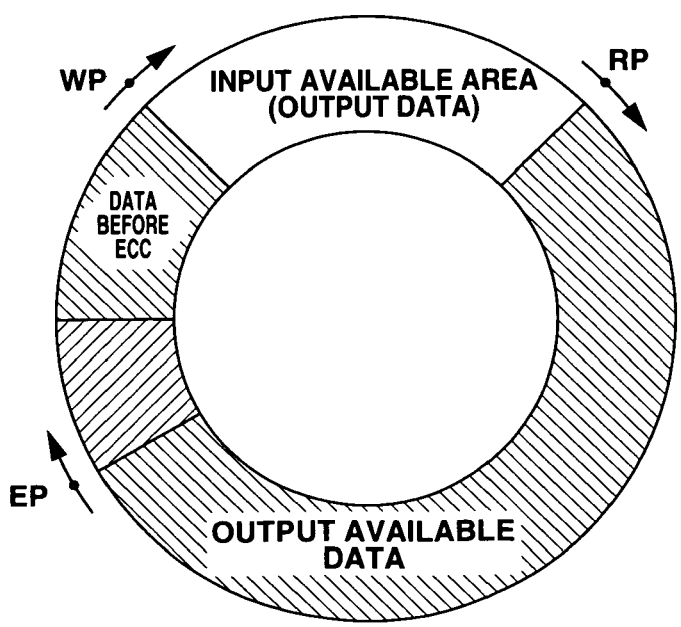
FIG. 12 is a drawing intended to illustrate the data structure of the ring buffer memory provided in the optical disk reproduction apparatus according to the present invention.

As shown in FIG. 12, WP stands for write pointer and shows the address of the point where write ends, and shows the address where data before ECC are written. EP stands for ECC end pointer, and this ECC end pointer shows the last address of output available data after the completion of the error correction process. RP stands for read pointer, and this read pointer RP shows the address of data that have been read (data that had been outputted). In other words, the data written between the read pointer RP and the ECC end pointer EP are data available for output from the ring buffer memory 6 to the decoders 12 and 15, the data written at addresses between the ECC end pointer EP and the write pointer WP are data whose errors have not been corrected, and the and the addresses between the write pointer WP and the read pointer RP constitutes an area available for storage by the memory controller 5.

In the case shown by FIG. 11, since the write pointer WP is positioned at the address (11), data are written up to the address (11). And the ECC end pointer EP is positioned at the address (9), which means that the data are processed for error correction up to the address (9). And as the read pointer RP is positioned at the address (2), data are written up to the address (2). Therefore, the error correction process is completed and read available data are position at the addresses (3)~(9), the data that have already been read and have become useless are positioned at the addresses (0)~(2), and the newly written data are positioned at the addresses (10) and (11).

Figure 13:
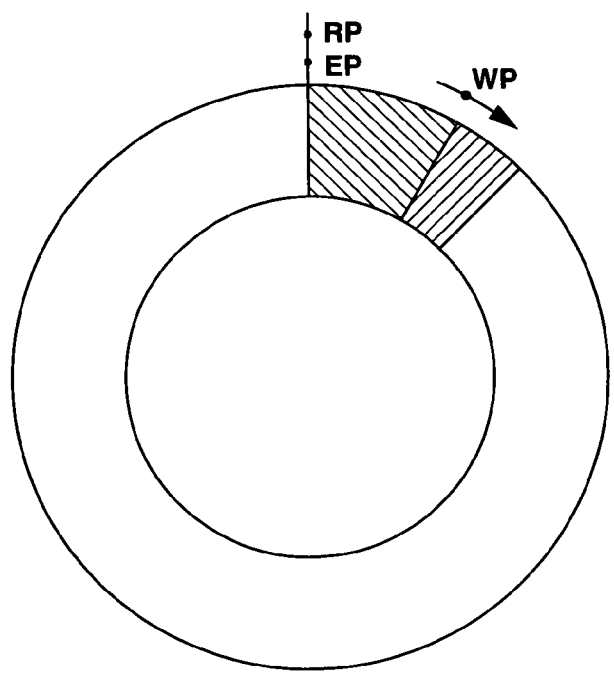
FIG. 13 is a drawing intended to illustrate each pointer of the ring buffer memory provided in the optical disk reproduction apparatus according to the present invention.
Figure 14:
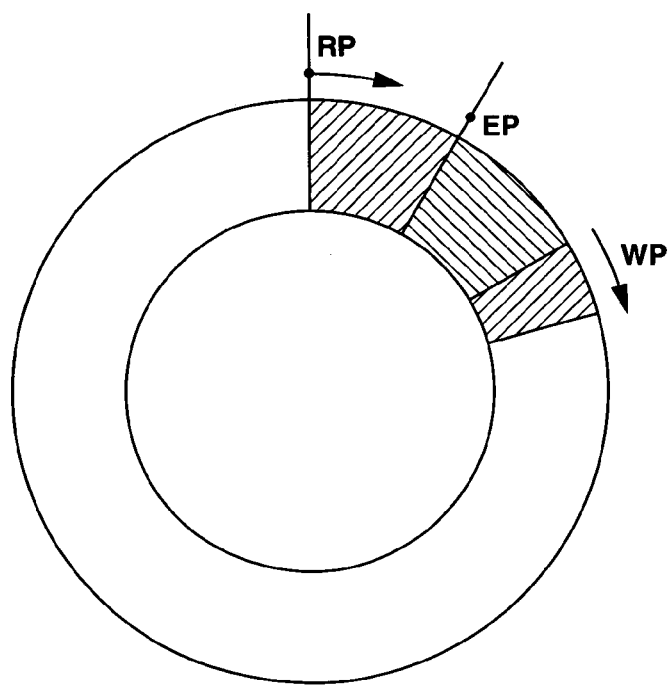
FIG. 14 is a drawing intended to illustrate each pointer of the ring buffer memory provided in the optical disk reproduction apparatus according to the present invention.
Figure 15:
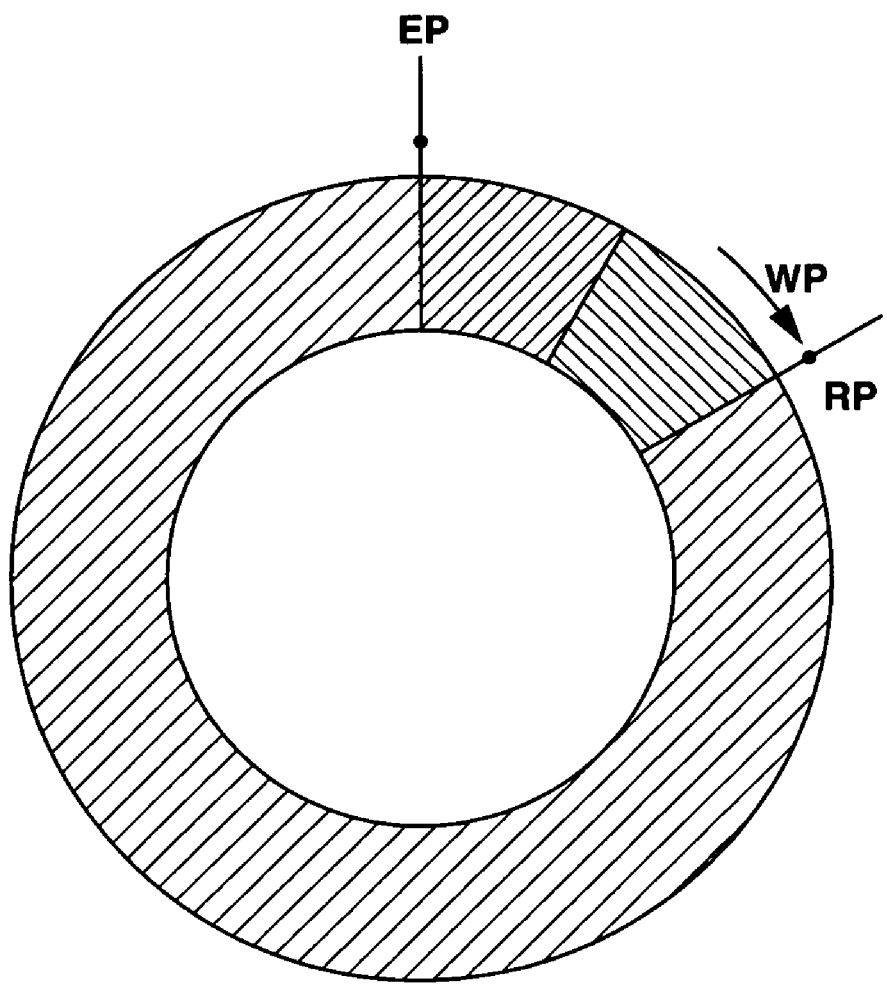
FIG. 15 is a drawing intended to illustrate each pointer of the ring buffer memory provided in the optical disk reproduction apparatus according to the present invention.

In specific terms, in the ring buffer memory 6, various pointers move as shown in FIGS. 13~15.

Suppose that data before error correction are written up to the write pointer WP. And these data before error correction are processed for error correction at the error correction circuit 7 to be sent to the ring buffer memory 6, and the space extending up to the error pointer EP represents data that have been processed for error correction and are available for output. And data up to the read pointer RP have already been read.

As shown in FIG. 13, in the first place demodulated data are written in the ring buffer memory 6. When the data are completely written, the write pointer WP is pushed forward by an ECC block, and the data are transferred to the error correction circuit 7 for the correction of errors of the PI series, PO series and PI series. When the error correction process is completed, a step for error detection is executed, the data processed for error correction are transferred to the ring buffer memory 6, and when the data of the block are fully transferred, the error pointer EP is pushed ahead by a block.

As shown in FIG. 14, the data processed for error correction become data output available data. When an output request signal is received, the data are read from the ring buffer memory 6, and the read pointer RP is pushed forward. At this time, the question of whether there are output available data or not is judged by the read pointer RP and the error pointer EP. In other words, the relationship between the error pointer EP and the read pointer RP is judged. If the relationship between the error pointer EP and the read pointer RP is EP>RP, there are output available data, and therefore data are outputted at a rear stage and the read pointer RP is pushed forward. If EP=RP, there are no output available data, and no data are outputted.

In case where there is no data output request from any circuit at a rear stage, the write pointer WP advances while the read pointer RP remains motionless. Therefore, the write pointer WP catches up with the read pointer RP. When the write pointer WP has caught up with the read pointer RP, and WP=RP, the write motion is suspended temporarily. And when a track jump is required, necessary steps are taken to assure that a track jump occurs. (Overflow control). If the read pointer RP advances thereafter and an area available for input has developed, it becomes possible to write demodulated data.

As stated above, in the optical disk apparatus, the memory controller 5 controls the ring buffer memory 6 so that the read pointer RP would not overtake the ECC end pointer EP, that the ECC end pointer EP would not overtake the write pointer WP, and that data write would be suspended when the write pointer WP has caught up with the read pointer RP.

And now the operation of the system controller 19 when the optical disk reproduction apparatus configured as stated above is used to reproduce data stored on an optical disk 1 will be described.

The system controller 19 specifies in advance in the sector detection part 4 the sector address number to be written in the ring buffer 6 operating as described above. For example, the system controller specifies the write-start-specifying address (SSA) that shows the sector address number where data writing starts in the ring buffer memory 6, and the write-end address (ESA) showing the sector address number where the date writing ends in the ring buffer memory 6. When the data stored in an optical disk 1 is to be reproduced, the system controller 19 supplies the write-start-specifying address SSA to the track-jump control circuit 17 so that the servo circuit 18 would output a track-jump command. And this leads the system controller 19 to control the servo circuit 18 to drive the optical pickup 2 to jump to a track position following the write-start-specifying address SSA.

The sector detection circuit 4 detects sector address numbers from the data demodulated by the demodulator circuit 3 and outputs the detected sector address numbers and the write-start-specifying address SSA to the memory controller 5. The memory controller 5 reads address for each sector of the optical disk 1 from the outputs of the sector detection circuit 4, compares the write-start-specifying address SSA and the write-end address ESA for each sector address number to determine whether they agree or not, and writes the data along with the write-start-specifying address SSA, and write-end address ESA in the ring buffer memory 6 by the ECC block. And the sector detection circuit 4 creates the first sector information and outputs the same to the system controller 19 through the memory controller 5.

Then, the system controller 19 controls the memory controller 5 to process the data written into the ring buffer memory 6 for error correction and error detection, and inputs the second sector information from the stream detection circuit 9.

The system controller 19 controls the memory controller 5 to write the first sector information created by the sector detection circuit 4 and the second sector information created by the stream detection circuit 9 in a specified area of the ring buffer memory 6. As a result, the system controller 19 designates bit 0 stored in the specified area as the start sector information, bit 1 as the end sector information, the bit 2 as the output specifying sector information, bit 3 as the correction result flag, and bit 4 as the IP output sector information.

Then, the system controller 19 controls the memory controller 5 to control the data to be outputted by the ring buffer memory 8 to the demultiplexer 10 based on the first sector information and the second sector information. And as a result, video data are reproduced through the demultiplexer 10, the video buffer 11 and the video decoder 12 and audio data are reproduced through the demultiplexer 10, the audio buffer 14, and the audio decoder 15.

In the optical disk reproduction apparatus, when video data are decoded, data are outputted from the ring buffer memory 6 to the video buffer 11 according to the code request signals created by the video decoder 12. When, for example, the succession of data processing related to simple pictures resulted in a shorter decoding time at the video decoder 12 and a reduced data transfer volume from the video buffer 11 to the video buffer 12, the rate of video transmission from the ring buffer memory 6 to the video buffer 11 also falls. As a result, when the write speed from the memory controller 5 is greater than the data transmission speed to the demultiplexer 10, the volume of data stored in the ring buffer memory 6 grows larger, and an overflow can develop in the ring buffer memory 6. Therefore, when the data volume has exceeded the required standard value set in advance, in response to a control signal supplied by the system controller 19 showing the volume of data presently stored in the ring buffer memory 6 according to the write pointer WP and reproduction pointer RP controlled by the memory controller 5, the track-jump control circuit 17 judges that the ring buffer memory 6 may overflow and outputs a track-jump signal to the servo circuit 18.

And the system controller 19, on inputting a sector address anomaly signal supplied by the sector detection circuit 4 and an error occurrence signal supplied by the error correction circuit 7, calculates the volume of output available data remaining in the ring buffer memory 6 from the ECC end pointer EP and the output pointer RP, and calculates also the volume of data necessary to insure a readout from the ring buffer memory 6 to the video buffer 11 while an optical disk 1 makes a rotation from the track position where the pickup 2 is scanning at present (one-rotation-wait period). When the volume of residual data in the ring buffer memory is large, even if data are read at the maximum transfer rate from the ring buffer memory 6, no underflow develops in the ring buffer memory 6. For this reason, the system controller 19 judges that it is possible recover from an error by reproducing again the data at the position where the error had occurred, and controls the track-jump control circuit 17 to output a track-jump signal to the servo circuit 18.

Accordingly, when the track-jump control circuit outputs a track-jump signal to the servo circuit 18, the servo circuit 18 controls the optical pickup 2 jump to another track in order to change the track position for reproduction by the optical pickup 2. In other words, when for example data are stored from the inner track towards the outer track of the optical disk 1, the servo circuit 18 controls the optical pickup 2 to jump from the current track position to an inner adjacent track. And in this optical disk reproduction apparatus, while the position of the reproduction track by the optical pickup 2 makes another round to return to its original position, in other words until the sector address number obtained by the sector detection circuit 4 becomes the sector address number at the time of the track jump, the writing of new data in the ring buffer memory is inhibited, and data already stored in the ring buffer memory are outputted in the video buffer 11 as required.

And when, after a track jump, the quantity of data stored in the ring buffer memory 6 exceeds the prescribed standard value, even if the sector address number obtained from the sector detection circuit agrees with the sector address number at the time of track jump, the track jump control circuit 17 does not resume writing data into the ring buffer memory 6 and effectuate another track jump.

Here, the ring buffer memory 6 has a capacity to store data enough to fill at least a track (a rotation) of an optical disk 1. Therefore, if the optical disk 1 is a CLV (Constant Line Velocity) disk, the rotation cycle turns out to be the maximum on the outermost track, and accordingly the ring buffer memory 6 has at least a storage capacity of a track (a rotation) at the outermost track, in other words a storage capacity of (rotation cycle at the outermost track)×(data transfer rate from the error correction circuit 7 to the ring buffer memory 6).

And in this optical disk reproduction apparatus, the maximum data transfer rate from the ring buffer memory 6 to the video buffer 11 is set at a value equal to the data transfer rate from the error correction circuit 7 to the ring buffer memory 6, or smaller than the data transfer rate from the error correction circuit 7 to the ring buffer memory 6. Such a setting enables the optical disk reproduction apparatus to output freely to the servo circuit 18 code request signals requiring the transfer of data from the video buffer 11 to the ring buffer memory 6 irrespective of the timing of track jumps.

And now, an example of rapid reproduction in the optical disk reproduction apparatus by outputting only I pictures out of the data stored in the optical disk 1will be described.

For a reproduction based on the use of only the video data of the I pictures stored on the optical disk 1 with this optical disk reproduction apparatus, in the first place, the sector detection circuit 4 and the stream detection circuit 9 create the first sector information and the second sector information.

In response to the input from outside of a command for a rapid reproduction of video data by using only the I pictures from outside, the system controller 19 controls the track-jump control circuit 17 to reproduce the video data stored in an optical disk 1 by the optical pickup 2. At this time, the system controller 19 specifies the write-start-specifying address (SSA) and the write-end address (ESA) to output a control signal to the track-jump control circuit 17 that makes the optical pickup 2 to jump to another track. The servo circuit 18 drives the optical pickup 2 to jump to a track position according to the write-start-specifying address SSA. The optical pickup 2 detects the data stored in the optical disk 1, the demodulator circuit 3 demodulates the data and the demodulated data are inputted into the sector detection circuit 4.

The sector detection circuit 4 detects sector address numbers from the data demodulated by the demodulator circuit 3, compares the sector address numbers detected with the write-start-specifying address SSA and the write-end address ESA and outputs the data to the memory controller 5. In other words, the sector detection circuit 4 reads addresses for each sector of the optical disk 1 from the output of the demodulator circuit 3, compares each sector address number with the write-start-specifying address SSA and write-end address ESA to determine whether they agree or not. And the sector detection circuit 4 outputs the data of the address number that agreed with the write-start-specifying address SSA and thereafter to the memory controller 5, and stops outputting the data on detecting a sector address number that agreed with the write-end address ESA. The memory controller 5 writes the data supplied by the sector detection circuit 4 in the ring buffer memory 6 by the ECC block and writes the first sector information in the specified area of the ring buffer memory 6.

The sector detection circuit 4 compares the sector address number of each sector with the write-start-specifying address SSA, and creates the first sector information by setting the bit for the start sector information of the relevant sector at "1" when the sector address number and write-start-specifying address SSA agree, and the bit for the output specifying sector information of the sector of a sector address number located between the write-start-specifying address SSA and the write-end address ESA at "1."

Then, the system controller 19 controls the memory controller 5 to output ECC blocks that include sectors whose bit for the output specifying sector information is "1" from the ring buffer memory 6 to the error correction circuit 7. The data outputted from the ring buffer memory 6 are processed at the error correction circuit 7 for error correction, processed again at the error detection circuit 8 for error detection to be stored at the ring buffer memory 6.

Then, the system controller controls the memory controller 5 to output the data that have been processed for error correction and error detection and the first sector information from the ring buffer memory 6 to the stream detection circuit 9. The stream detection circuit 9 determines whether the data are those including I pictures or not for each sector proceeding from the ring buffer memory 6, and in case of data that include I pictures, the stream detection circuit 9 sets the bit for the IP output sector information of the relevant sector at "1." Furthermore, the stream detection circuit 9 outputs IP end detection signals to the system controller 19. The system detection circuit 9, on creating the second sector information, outputs the same to the system controller. The system controller 19 controls the memory controller 5 to have the ring buffer memory 6 store the second sector information supplied by the stream detection circuit 9.

For outputting the data stored in the ring buffer memory 6 outputted to the demultiplexer for reproduction, the system controller 19, in advance before reading the data, reads the first and second sector information from the ring buffer memory 8, controls the memory controller 5 so that only the data of the sector in which the logical multiplication of bits for the output specifying sector information and IP output sector information is "1" would be outputted to the video decoder for a rapid reproduction of video data and audio data.

Then, the process of creating the first and second sector information with the sector detection circuit 4 and the stream detection circuit 9 will be explained by referring to FIG. 16.

FIG. 16 shows the function of the sector detection circuit 4 and the stream detection circuit 9 for outputting data between the sector (5) and the sector (9) when the data between the sector (0) and the sector (F) are stored in the ring buffer memory 6. In this case, the system controller 19 sets the write-start-specifying address SSA at the sector (0) and the write-end address ESA at the sector (99) and controls the track-jump control circuit 17 and the memory controller 5 to have the ring buffer memory 6 store such settings (BFF_WR).

At this time, the sector detection circuit 4 determines that the sector address number and the write-start-specifying address SSA have agreed when it has detected a sector (0), and sets the bit for the start sector information of the sector (0) at "1," and the bit for the output specifying sector information of the sector (0) and thereafter at "1." Accordingly, the sector detection circuit 4 creates the first sector information composed of the start sector information, the end address information and the output specifying sector information.

In response to the input of data of which bit for the output specifying sector information is "1," and upon detecting the group start code GopHdr and the picture start code PicHdr for I picture at the sector (5), the stream detection circuit 9 sets the bit for the IP output sector information for the sector (5) and thereafter at "1." And the stream detection circuit 9, upon detecting the picture start code PicHdr for B picture at the sector (8), sets the bit for the IP output sector information for the sector (9) and thereafter at "0." And the stream detection circuit 9 sets the bit for the correction result flag at "0" in response to the error detection result at the error detection circuit 8. Accordingly, the stream detection circuit 9 creates the second sector information consisting of correction result flags whose bit for the whole sector is "1" and IP output sector information whose bit for the sectors (5) to (8) is "1." And the stream detection circuit 9 outputs the second sector information created to the system controller 19. The system controller 19 controls the memory controller 5 so that the second sector information inputted would be stored in the ring buffer memory 6.

When the system controller 19 outputs the data stored in the ring buffer memory 6 to the video decoder 12 to reproduce the data while the first sector information and the second sector information remain stored in the ring buffer memory 6, the system controller reads the first and second sector information, and controls the memory controller 5 so that the data of the sectors where the logical multiplication of the output specifing sector information and the IP output sector information would be outputted from the ring buffer memory 6 to the video decoder 12 (BUFF_RD).

And now, an example of a rapid reproduction in the forward direction by decoding only I pictures with the optical disk reproduction apparatus will be explained.

In this FIG. 17, in the first place, the system controller 12 controls the memory controller to start reproduction by setting the write-start-specifying address SSA at (2) and the write-end address ESA at (99) (FIG. 17A, PB_DATA).

Then, the system controller controls the memory controller so that the sector detection part 4 would detect the sector (2) and start writing data and the first sector information in the ring buffer memory 6 (FIG. 17B, BUFF_WR). Here, the system controller 19 controls the memory controller 5 to write sequentially the data in the sector 2 and thereafter in the ring buffer memory 6 from the time $t_2$.

Then, when data enough to fill an ECC block have been written in the ring buffer memory, the system controller 19 controls the memory controller to start correcting errors, detecting errors and creating the second sector information (FIG. 17C, ECC+(STREAM_DET)). Thereupon, the error correction circuit 7 processes the data supplied by the memory controller for error correction, the error detection circuit 8 processes the same for error detection, and the memory controller 5 inputs the corrected data and the result of error detection into the stream detection circuit.

And the stream detection circuit 9 creates the second sector information over the sectors (2) to (4) at the time $t_6$, and outputs the IP output end detection signal to the system controller 19 (!IP_END_DET). In response to the IP output end detection signal supplied by the stream detection circuit, the system controller 19 controls the memory controller 5 to stop the process of storing data in the ring buffer memory 6 and controls the memory controller 5 to stop the process of error correction (WR-STOP, ECC_STOP). In addition, the system controller 19 controls the memory controller 5 to write the second sector information created by the stream detection circuit 9 into the ring buffer memory 6.

Then, the system controller 19 outputs from the time $t_4$ onwards the data of the sectors that contain I picture data on the sectors (2) to (4) based on the first sector information and the second sector information (FIG. 17D, BUFF_RD). And the video decoder receives from the time t5 onwards the data of the sectors (3) to (4) that contain I picture data among the data of the sector (3) and thereafter, decodes them (FIG. 17E, VIDEO_DEC), and makes an outside display apparatus display new I pictures (FIG. 17F, DISPLAY).

In an optical disk apparatus performing such functions, even if the sector detection circuit 4 cannot detect sectors with sector address numbers agreeing with the write-end address ESA, it is possible to confirm the end of absorption of the output specifying sectors when the stream detection circuit 9 has inputted the IP output end detection signals and to control the output of data to be reproduced from the ring buffer memory based on the first and the second sector information.

In other words, in this optical disk reproduction apparatus, when proceeding to a rapid reproduction by reproducing only I pictures, sectors beginning with the one containing a picture start code and ending with another in which the following picture start code PicHdr, group start code GopHdr or sequence end SeqEnd has been detected are decoded as sectors containing I picture data, and in response to the IP output end detection signals given every time when the error detection circuit 8 finishes detecting errors, the system controller 19 proceeds to reproduce the following I picture data. For this reason, it is possible to prevent the reproduction of picture data which are not I pictures. Therefore, the optical disk reproduction method can shorten the interval of reproducing I pictures and realize a smooth rapid reproduction when only I pictures are reproduced for a rapid reproduction.

And according to this optical disk reproduction apparatus, it is possible to store data processed for error correction directly into a ring buffer memory, and to output corrected data stored in the ring buffer memory 6 to the demultiplexer 10 in response to the IP output sector detection signals according to the first and second sector information. For this reason, it is possible to shorten the interval of reproducing I pictures than an optical disk reproduction apparatus in which the memory for error correction and the ring buffer memory 6 are disposed separately. And this optical disk reproduction apparatus can simplify the configuration of the apparatus than an optical disk reproduction apparatus in which the memory for error correction and the ring buffer memory 6 are separately disposed and avoid a larger dimension of the apparatus.

And in this optical disk reproduction apparatus, not only the case of pushing forward the error pointer EP of the ring buffer memory 6 in response to the completion of an error correction process and an error detection process for each ECC block, but also when only I pictures are reproduced rapidly in the forward direction, it is possible to push forward the error pointer EP only when an IP output end detection signal has been detected without the error detection circuit 8 detecting any error.

In this type of optical disk reproduction apparatus in which the error pointer EP does not advance until an IP output end detection signal is detected, when errors are detected in the I picture data being absorbed in the ring buffer memory 6, the error pointer EP remains motionless at the position it had occupied when the absorption of the I picture being absorbed started, the read pointer RP does not overtake it, and no data of I picture involving errors are not outputted to the decoder. And in this optical disk reproduction apparatus, when an error is detected after the correction of errors, it is possible to retry reproduction depending on the quantity of output available data remaining in the ring buffer memory 6. At this time, one can push back the write pointer WP to the point indicated by the error pointer EP.

In the description of the optical disk reproduction apparatus given above, an example of decoding only a single I picture at the time of rapid reproduction is described. But, two pictures consisting of an I picture and a P picture can be reproduced for a rapid reproduction. The stream detection circuit 9 of such an optical disk reproduction apparatus sets the bit for the IP output sector information for the period beginning with the detection of the picture start code PicHdr for I pictures followed by the detection of the picture start code PicHdr for P pictures and ending with the detection of the picture start code PicHdr for the following I pictures, P pictures or B pictures at "1." And the stream detection circuit 9 sets the bit for the IP output sector information for the period beginning with the detection of the picture start code PicHdr for I pictures and ending with the detection of the group start code GopHdr or sequence end code SeqEnd at "1." Another possible mode of embodiment is to have the stream detection circuit 9 specify the sector beginning with the detection of the picture start code PicHdr for I pictures and ending with the detection of whichever comes first of the two cases mentioned above as the output specifying sector, and set the IP output sector bit for the second sector information at "1."

And it is also possible to have the optical disk reproduction apparatus decode and reproduce three pictures consisting of I pictures and P pictures for rapid reproduction. The stream detection circuit 9 of such an optical disk reproduction apparatus sets the bit for the IP output sector information for the period beginning with the detection of the picture start code PicHdr for I pictures followed by the two consecutive detections of the picture start code PicHdr for P pictures and ending with the detection of the picture start code PicHdr for I pictures, P pictures or B pictures at "1." And the stream detection circuit 9 sets the bit for the IP output sector information for the period beginning with the detection of the picture start code PicHdr for I pictures and ending with the detection of the group start code GopHdr or the sequence end SeqEnd at "1." And the stream detection circuit 9 may also specify the sector beginning with the detection of the picture start code PicHdr for I pictures and ending with the detection of whichever comes first of the two cases mentioned above as the output specifying sector and set the IP output sector bit for the second sector information at "1."

In such an optical disk reproduction apparatus, it is possible to have the system controller 19 choose the specification of the reproduction mode by using only I pictures, the reproduction mode by using three pictures consisting of I pictures and P pictures and the mode of outputting three pictures consisting of I pictures and P pictures and voice and to control the memory controller 5. This system controller 19 can switch for example between the mode of rapid reproduction by using only I pictures and the mode of rapid reproduction by using three picture consisting of I pictures and P pictures depending on the reproduction time (reproduction speed) required for a rapid reproduction. And the system controller 19 chooses the mode of rapid reproduction by using only I pictures when, for example, proceeding to a title scanning in which only the first I pictures of the titles of pictures stored in the optical disk 1 are displayed in a multiple picture display format.

What is claimed is:

1. A data reproduction apparatus comprising:
   pickup means for picking up data of a sector from a recording medium;
   sector detecting means for detecting a sector, and for creating a first reproduction control information indicating the sector to be reproduced;
   storage means for storing said data;
   error correction means for correcting errors of said data stored in said storage means for a predetermined number of sectors, and for storing the corrected data in said storage means;
   stream detecting means for detecting a sector that includes at least intra picture data and for creating a second reproduction control information indicating the sector that includes said at least intra picture data corrected by said correction means;
   decoding means for decoding a part of said data corrected by said correction means and stored in said storage means referring to said first reproduction control information and said second reproduction control information in case of a rapid reproduction, and for outputting said part of said data as a regenerative signal; and
   control means for controlling to stop the process of storing data in said storing means and to stop the process of error correction by said correction means referring to said second reproduction control information.

2. The data reproduction apparatus according to claim 1 wherein said storage means is a ring buffer and stores MPEG data reproduced from said recording medium by said reproduction means at least enough to fill a track or MPEG data processed for error correction by said error correction means at least enough to fill a track.

3. The data reproduction apparatus according to claim 2 wherein said controlling means controls a data output pointer of said ring buffer based on the second reproduction control information created by said stream detecting means.

4. The data reproduction apparatus according to claim 2
   wherein said first reproduction control information and said MPEG data arranged by the sector are linked and stored in said storage means, and said correction means corrects an error of MPEG data linked with said first reproduction control information and stored in said storage means, and
   wherein said second reproduction control information and the MPEG data arranged by the sector are linked and stored in said storage means, and said decoding means controls in such a manner that MPEG data linked with said second reproduction control information and stored in said storage means may be reproduced.

5. The data reproducing apparatus according to claim 1 further comprising:
   storage control means for controlling the input and output of MPEG data stored in said storing means, and
   wherein said storage control means rearranges MPEG data reproduced from said recording medium by said reproduction means and having a data structure sequentially arranged by MPEG data and parity data, and stores the same in said storage means.

6. The data reproducing apparatus according to claim 1 wherein said sector detecting means creates information indicating MPEG data outputted as regenerative signal as the first reproduction control information based on a sector address information added to each sector of said MPEG data reproduced by said reproducing means.

7. The data reproducing apparatus according to claim 1 wherein said recording medium is an optical memory disk reproducing data by the irradiation of light and said pickup means includes an optical pickup.

8. The data reproducing apparatus according to claim 1 wherein picture signals are recorded in said recording medium.

9. A data reproduction method comprising the steps of:
   picking up data of a sector from a recording medium;
   creating a first reproduction control information indicating said sector to be reproduced;
   storing said data in a buffer;
   correcting error of said data designated by said first reproduction control information;
   storing the corrected data in said buffer;
   detecting a sector that includes at least intra picture data;
   creating a second reproduction control information indicating the sector which includes said at least intra picture data corrected;
   decoding a part of said data referring to said first reproduction control information and said second reproduction control information for rapid reproduction; and
   controlling to stop the process of storing data and to stop the process of error correction referring to said second reproduction control information.

10. The data reproduction method according to claim 9 wherein data reproduced at least enough to fill a track or data processed for error correction at least enough for a track are stored in a ring buffer.

11. The data reproduction method according to claim 10 wherein a data output pointer of said ring buffer is controlled based on said second reproduction control information.

12. The data reproduction method according to claim 10 wherein, said first reproduction control information is linked with the MPEG data by the sector and stored;

the MPEG data linked with said first reproduction control information are corrected;

said second reproduction information is linked with the MPEG data by the sector and stored; and the MPEG data linked with said second reproduction control information is decoded for rapid reproduction.

13. The data reproduction method according to claim 9 wherein data reproduced from said recording medium and having a data structure in which MPEG data and parity data are arranged in succession are rearranged and stored in said ring buffer.

14. The data reproduction method according to claim 9 wherein information indicating MPEG data to be outputted as regenerative signal is created as the first reproduction control information based on sector address information added to each sector of the MPEG data reproduced.

15. The data reproduction method according to claim 9 wherein said recording medium is an optical memory disk that reproduces by the irradiation of light with an optical pickup.

16. The data reproduction method according to claim 9 wherein picture signals are recorded on said recording medium.

* * * * *